United States Patent
Kim et al.

(10) Patent No.: US 9,385,402 B2
(45) Date of Patent: Jul. 5, 2016

(54) SECONDARY BATTERY PACK OF EMBEDDED TYPE WITH NOVEL STRUCTURE

(75) Inventors: Tae-Wook Kim, Chungcheongbuk-do (KR); Ju-Hwan Baek, Chungcheongbuk-do (KR); Sangkwon Nam, Suwon-si (KR); JinHyun Ryu, Busan (KR)

(73) Assignee: LG CHEM, LTD., Seoul (KR)

( * ) Notice: Subject to any disclaimer, the term of this patent is extended or adjusted under 35 U.S.C. 154(b) by 584 days.

(21) Appl. No.: 13/402,706

(22) Filed: Feb. 22, 2012
(Under 37 CFR 1.47)

(65) Prior Publication Data
US 2013/0216866 A1   Aug. 22, 2013

(51) Int. Cl.
| H01M 10/04 | (2006.01) |
| H01M 2/00 | (2006.01) |
| H02H 3/00 | (2006.01) |
| H01M 10/42 | (2006.01) |
| H01M 2/02 | (2006.01) |

(52) U.S. Cl.
CPC ...... *H01M 10/4257* (2013.01); *H01M 10/0436* (2013.01); *H01M 2/0212* (2013.01); *H01M 2200/10* (2013.01); *Y10T 29/49108* (2015.01)

(58) Field of Classification Search
CPC ............ H01M 10/4257; H01M 10/0436; H01M 2/0212; H01M 2200/10; Y10T 29/49108
See application file for complete search history.

(56) References Cited

U.S. PATENT DOCUMENTS

| 6,225,778 | B1* | 5/2001 | Hayama et al. ............... 320/112 |
| 2006/0119316 | A1* | 6/2006 | Sasaki et al. .................. 320/106 |
| 2006/0269831 | A1* | 11/2006 | Kim ................................ 429/62 |
| 2007/0065718 | A1* | 3/2007 | Moon ........................... 429/185 |
| 2007/0202396 | A1* | 8/2007 | Jung .................... H01M 2/0404 429/174 |
| 2010/0159313 | A1* | 6/2010 | Byun et al. .................... 429/100 |
| 2010/0203374 | A1* | 8/2010 | Kano ................. H01M 2/1061 429/100 |
| 2010/0239895 | A1* | 9/2010 | Yang et al. ...................... 429/53 |
| 2011/0229744 | A1* | 9/2011 | Hirota .............................. 429/7 |
| 2012/0070702 | A1 | 3/2012 | Byun et al. |
| 2012/0276420 | A1 | 11/2012 | Baek et al. |

FOREIGN PATENT DOCUMENTS

| EP | 1 760 804 A1 | 3/2007 |
| KR | 10-0889624 B1 | 3/2009 |
| KR | 10-2009-0077135 A | 7/2009 |

(Continued)

*Primary Examiner* — Carlos Barcena
*Assistant Examiner* — Lilia V Nedialkova
(74) *Attorney, Agent, or Firm* — Birch, Stewart, Kolasch & Birch, LLP

(57) ABSTRACT

A secondary battery pack is provided. The secondary battery pack has a structure in which a protection circuit module (PCM) is mounted to a top of a plate-shaped battery cell having electrode terminals formed at an upper end thereof, the PCM includes a printed circuit board (PCB) having a protection circuit formed thereon, a safety element electrically connected between one of the electrode terminals of the battery cell and the protection circuit of the PCB, an external input and output terminal electrically connected to the protection circuit of the PCB, and an electrically insulative module case to cover the PCB and the safety element in a state in which the external input and output terminal extends outside. The PCM is loaded on an upper end case extension portion of the battery cell in a state in which the PCM is electrically connected to the electrode terminals of the battery cell.

7 Claims, 5 Drawing Sheets

(56) References Cited

FOREIGN PATENT DOCUMENTS

| | | | |
|---|---|---|---|
| KR | 10-0932224 B1 | 12/2009 | |
| KR | 10-1031178 B1 | 4/2011 | |
| KR | 10-1059756 B1 | 8/2011 | |
| WO | WO 2009069673 A1 | * | 6/2009 |
| WO | WO 2009069943 A2 | * | 6/2009 |

* cited by examiner

SECONDARY BATTERY PACK OF EMBEDDED TYPE WITH NOVEL STRUCTURE

TECHNICAL FIELD

The present invention relates to an embedded type secondary battery pack of a novel structure, and, more particularly, to a secondary battery pack configured to have a structure in which a protection circuit module (PCM) is mounted to a top of a plate-shaped battery cell having electrode terminals formed at an upper end thereof, wherein each of the electrode terminals of the battery cell is made of a plate-shaped conductive member, the PCM includes a printed circuit board (PCB) having a protection circuit formed thereon, a safety element electrically connected between one of the electrode terminals of the battery cell and the protection circuit of the PCB, an external input and output terminal electrically connected to the protection circuit of the PCB, and an electrically insulative module case to cover the PCB and the safety element in a state in which the external input and output terminal extends outside, and the PCM is loaded on an upper end case extension portion of the battery cell in a state in which the PCM is electrically connected to the electrode terminals of the battery cell.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent preservation and service-life characteristics, which has been widely used as an energy source for various electronic products as well as mobile devices.

Depending upon kinds of external devices in which secondary batteries are used, the secondary batteries may be configured to have a detachable type structure in which the secondary batteries can be easily inserted into and removed from the external devices or to have an embedded type structure in which the secondary batteries are embedded in the external devices. For example, it is possible for a user to insert or remove a battery into or from a device, such as a laptop computer. On the other hand, a device, such as a mobile phone or an MPEG audio layer-3 (mp3) player, requires an embedded type battery pack due to the structure and capacity thereof.

Meanwhile, various kinds of combustible materials are contained in the lithium secondary battery. As a result, the lithium secondary battery may be heated or explode due to the overcharge of the battery, the overcurrent in the battery, or other external physical impact. That is, the safety of the lithium secondary battery is very low. Consequently, safety elements, such as a positive temperature coefficient (PTC) element and a protection circuit module (PCM), to effectively control an abnormal state of the lithium secondary battery, such as the overcharge of the lithium secondary battery or the overcurrent in the lithium secondary battery, are connected to a battery cell.

Generally, an embedded type secondary battery pack uses a plate-shaped battery cell, which is suitable for electrical connection, and a PCM is connected to the battery cell via conductive nickel plates by welding or soldering. That is, the nickel plates are connected to electrode terminals of the battery cell by welding or soldering, a flexible printed circuit board (F-PCB) is attached to one side of a double-sided adhesive tape, a protective tape is attached to the other side of the double-sided adhesive tape, and electrode tabs of the F-PCB and the nickel plates are connected to each other by welding in a state in which the F-PCB is in tight contact with the battery cell. In this way, the PCM is connected to the battery cell to manufacture a battery pack.

It is required for the safety elements, including the PCM, to be maintained in electrical connection with the electrode terminals of the battery cell and, at the same time, to be electrically isolated from other parts of the battery cell.

To this end, insulative tapes are attached to various members, including the PCM. In addition, a sealed portion of a battery case, in which the battery cell is mounted, is partially bent, and an insulative tape is attached thereto or a barcode is printed thereon. That is, the process is very complicated.

Since a plurality of insulative tapes or parts is required to achieve safe connection as described above, a battery pack assembly process is complicated, and manufacturing cost is increased.

Also, when external impact is applied to the battery pack, the PCM may be damaged or dimensional stability may be greatly lowered due to the use of the insulative tapes, which exhibit low mechanical strength.

Therefore, there is a high necessity for a technology that is capable of reducing the number of members mounted to the battery cell to simplify an assembly process, achieving stable coupling between members loaded in the battery cell and protecting the PCM.

DISCLOSURE

Technical Problem

Therefore, the present invention has been made to solve the above problems, and other technical problems that have yet to be resolved.

Specifically, it is an object of the present invention to provide a secondary battery pack wherein the number of parts necessary to manufacture the battery pack is reduced, thereby simplifying an assembly process, and structural stability of the battery pack is improved.

Technical Solution

In accordance with one aspect of the present invention, the above and other objects can be accomplished by the provision of a secondary battery pack configured to have a structure in which a protection circuit module (PCM) is mounted to a top of a plate-shaped battery cell having electrode terminals formed at an upper end thereof, wherein each of the electrode terminals of the battery cell is made of a plate-shaped conductive member, the PCM includes a printed circuit board (PCB) having a protection circuit formed thereon, a safety element electrically connected between one of the electrode terminals of the battery cell and the protection circuit of the PCB, an external input and output terminal electrically connected to the protection circuit of the PCB, and an electrically insulative module case to cover the PCB and the safety element in a state in which the external input and output terminal extends outside, and the PCM is loaded on an upper end case extension portion of the battery cell in a state in which the PCM is electrically connected to the electrode terminals of the battery cell.

That is, in the secondary battery pack according to the present invention, the PCM, configured to have a structure in which the PCB and the safety element are mounted in the module case, is loaded on the upper end case extension portion of the battery cell. As compared with a conventional embedded type secondary battery pack, therefore, it is possible to effectively protect the PCM and to considerably reduce the number of parts, thereby greatly improving manufacturing processability.

Various kinds of battery cells may be used in the secondary battery pack according to the present invention. The battery cell used in the secondary battery pack according to the present invention may be a pouch-shaped secondary battery, having an electrode assembly of a cathode/separator/anode structure mounted in a battery case made of a laminate sheet including a metal layer and a resin layer in a sealed state, the thickness and weight of which are small.

In such a pouch-shaped secondary battery, the upper end case extension portion may be an upper end sealed portion formed when a battery case is thermally welded to a sealed state. Consequently, it is possible for the PCM to be easily loaded on the upper end case extension portion, i.e. the upper end sealed portion, of the battery cell. For example, the plate-shaped electrode terminals protruding from the upper end of the battery case side by side may be bent, and then the PCM may be mounted on the upper end case extension portion of the battery cell.

In a concrete example, a safety element connection portion and an external input and output terminal connection portion may be formed at the front side of the PCB, and a battery cell terminal connection portion may be formed at the rear side of the PCB. In this case, one of the electrode terminals, i.e. the cathode terminal or the anode terminal, of the battery cell may be directly connected to the battery cell terminal connection portion formed at the rear side of the PCB, the other electrode terminal may be connected to the safety element, and the safety element may be connected to the safety element connection portion formed at the front side of the PCB.

In another concrete example, the external input and output terminal connection portion may be formed at the front side of the PCB, and the safety element connection portion and the battery cell terminal connection portion may be formed at the rear side of the PCB. In this case, one of the electrode terminals, i.e. the cathode terminal or the anode terminal, of the battery cell may be directly connected to the battery cell terminal connection portion formed at the rear side of the PCB, and the other electrode terminal may be connected to the safety element connection portion formed at the rear side of the PCB via the safety element.

The safety element is an element to interrupt current when the temperature of the battery cell rises, thereby securing safety of the battery pack. For example, the safety element may be a positive temperature coefficient (PTC) element, the resistance of which increases with the increase of temperature, or a fuse, which is cut with the increase of temperature. However, the safety element is not limited to the PTC element or the fuse.

In the structure in which the safety element connection portion is formed at the front side of the PCB and the battery cell terminal connection portion is at the rear side of the PCB as described above, the safety element may be bent so that one end of the safety element is located at the rear side of the PCB in a state in which the other end of the safety element is connected to the safety element connection portion of the PCB so as to cover one side (one corner region) of the PCB.

Consequently, one of the electrode terminals of the battery cell is coupled to the other end of the safety element by welding, and the other electrode terminal is electrically connected to the battery cell terminal connection portion with the result that the PCB and the battery cell, which are connected to each other via the safety element, are exposed outside by the external input and output terminal connection portion connected to the opposite side of the PCB by welding.

The form of the external input and output terminal is not particularly restricted so long as the external input and output terminal can be electrically connected to the PCB to supply current from an external device, such as a charger, to the battery cell or to supply current from the battery cell to a mobile phone, a smart pad, etc. In a preferred example, the external input and output terminal may be configured in the form of a wire.

As previously described, the module case, in which the PCB and the safety element are mounted, is loaded on the upper end case extension portion of the battery cell in a state in which the external input and output terminal extends outside. For example, the module case may include through grooves, through which the electrode terminals of the battery cell are inserted, and another through groove, through which the external input and output terminal extends outside. The latter through grooves may be different from the former through grooves in terms of positions and shapes thereof depending upon the mounting position and structure of the external input and output terminal. For example, the latter through grooves may be slits formed at one lateral side of the module case.

According to circumstances, the through grooves, through which the electrode terminals of the battery cell are inserted, and the through grooves, through which the external input and output terminal extends outside, may be configured to have a single unit through hole structure in which the through grooves communicate with each other.

As a result, the PCB and the safety element are mounted in the module case excluding the electrode terminals of the battery cell and the external input and output terminal extending through the through grooves or the through hole. Consequently, it is possible to improve overall mechanical strength of the PCM and to greatly reduce the amount of an insulative tape used as compared with a conventional embedded type battery pack.

In a preferred example, the module case may include an upper case and a lower case, which are connected to each other by a hinge structure, and the module case may be configured to have an assembly type fastening structure, by which the upper case and the lower case constituting the module case are coupled to each other in a state in which the PCB and the safety element are mounted in the module case.

Consequently, the PCB and the safety element are mounted to the upper case or the lower case, and the upper case and the lower case are coupled to each other by the fastening structure, and therefore, it is possible to provide a structure in which the PCB and the safety element are stably mounted without using additional members.

The assembly type fastening structure is not particularly restricted so long as the assembly type fastening structure is formed at the module case to fasten the upper case and the loser case to each other. For example, the assembly type fastening structure may be constituted by fastening protrusions formed at opposite lateral side ends of the lower case and fastening grooves formed at opposite lateral side ends of the upper case so that the fastening grooves correspond to the fastening protrusions.

In the above-mentioned assembly type fastening structure, it is possible to easily achieve assembly of the upper case and the lower case and to secure stable coupling between the upper case and the lower case.

In another preferred example, the module case may be a single unit rectangular parallelepiped member formed in a shape corresponding to the shape of the upper end case extension portion of the battery cell, on which the module case is loaded. One side of the rectangular parallelepiped member may be open so that electrode terminals (not shown) of the battery cell can be inserted through the open side, and the rectangular parallelepiped member may have a slit formed at a side adjacent to the open side so that the external input and output terminal can extend outside through the slit.

This module case having such a single unit structure is simpler than the module case having the above-mentioned assembly type fastening structure, and therefore, it is possible to easily manufacture the module case having the single unit structure.

Meanwhile, insulative tapes may be further attached to opposite lateral sides of the battery cell. That is, opposite lateral sides of the sealed portion formed when the battery case is thermally welded to a sealed state are electrically insulated by the insulative tapes. According to circumstances, when the opposite lateral sides of the sealed portion are bent and brought into tight contact with the main body of the battery cell, a double-sided adhesive tape may be further attached to each lateral side of the sealed portion or a region of the main body of the battery cell corresponding thereto so as to maintain the tight contact therebetween. The double-sided adhesive tape may be an additional member or may be attached to one side of each of the insulative tapes.

Also, a label may be attached to cover outer sides of the PCM and the battery cell excluding the external input and output terminal. Consequently, it is possible to more stably secure electrical connection between the electrode terminals of the battery cell and the PCB while generally maintaining an insulated state.

In accordance with another aspect of the present invention, there is provided a protection circuit module of a specific structure which is used to constitute the secondary battery pack with the above-stated construction.

Specifically, there is provided a protection circuit module (PCM) to be mounted to a top of a plate-shaped battery cell having electrode terminals, each of which is made of a plate-shaped conductive member, formed at an upper end thereof, wherein the PCM includes a printed circuit board (PCB) having a protection circuit formed thereon, a safety element electrically connected between one of the electrode terminals of the battery cell and the protection circuit of the PCB, an external input and output terminal electrically connected to the protection circuit of the PCB, and an electrically insulative module case to cover the PCB and the safety element in a state in which the external input and output terminal extends outside.

In a general process of assembling an embedded type secondary battery pack, a connection member and a PCM are coupled, and an insulative tape is attached at each step, so that a PCM assembly is mounted on a battery cell, as previously described. That is, the PCM assembly is mounted to the battery cell using a large number of parts. Consequently, a large number of processes are required. Also, mechanical strength and structural stability of the battery pack are low.

On the other hand, the protection circuit module according to the present invention is configured to have a structure in which the safety element is mounted in the module case in a state in which the safety element is coupled to the PCB. Consequently, structural stability of the battery pack is improved, and a process of manufacturing the battery pack is greatly simplified.

In a concrete example, a safety element connection portion and an external input and output terminal connection portion may be formed at the front side of the PCB, a battery cell terminal connection portion may be formed at the rear side of the PCB, and the safety element may be bent so that one end of the safety element is located at a rear side of the PCB in a state in which the other end of the safety element is connected to the safety element connection portion of the PCB so as to cover one side of the PCB.

For example, the external input and output terminal is configured in the form of a wire; however, the external input and output terminal is not limited thereto.

In another concrete example, the external input and output terminal connection portion may be formed at the front side of the PCB, and the safety element connection portion and the battery cell terminal connection portion may be formed at the rear side of the PCB. In this case, one of the electrode terminals, i.e. the cathode terminal or the anode terminal, of the battery cell may be directly connected to the battery cell terminal connection portion formed at the rear side of the PCB, and the other electrode terminal may be connected to the safety element connection portion formed at the rear side of the PCB via the safety element.

In a preferred example, the module case may include an upper case and a lower case, which are connected to each other by a hinge structure, having through grooves, through which the electrode terminals of the battery cell are inserted, and another through groove, through which the external input and output terminal extends outside, and the module case may be configured to have an assembly type fastening structure, by which the upper case and the lower case constituting the module case are coupled to each other in a state in which the PCB and the safety element are mounted in the module case.

In another preferred example, the module case may be a single unit rectangular parallelepiped member formed in a shape corresponding to the shape of the upper end case extension portion of the battery cell, on which the module case is loaded. One side of the rectangular parallelepiped member may be open so that the electrode terminals of the battery cell can be inserted through the open side, and the rectangular parallelepiped member may have a slit formed at a side adjacent to the open side so that the external input and output terminal can extend outside through the slit.

In accordance with a further aspect of the present invention, there is provided a method of manufacturing the secondary battery pack with the above-stated construction.

In a first concrete example, the secondary battery pack according to the present invention may be manufactured using a secondary battery pack manufacturing method including (a) bending a safety element so that one end of the safety element is located at the rear side of a PCB in a state in which the other end of the safety element is connected to a safety element connection portion formed at the front side of the PCB so as to cover one side of the PCB, (b) connecting an external input and output terminal to an external input and output terminal connection portion formed at the front side of the PCB, (c) mounting the PCB, to which the safety element is connected, in an open module case of a PCM and connecting electrode terminals of a battery cell to a battery cell terminal connection portion formed at the rear side of the PCB and the bent end of the safety element, (d) coupling an upper case and a lower case to each other in a state in which the external input and output terminal extends outside to assemble the PCM, and (e) bending the electrode terminals of the battery cell and mounting the PCM on an upper end sealed portion of the battery cell.

In a second concrete example, the secondary battery pack according to the present invention may be manufactured using a secondary battery pack manufacturing method including (a) connecting one end of a safety element to a safety element connection portion formed at one side of a PCB, (b) connecting an external input and output terminal to an external input and output terminal connection portion formed at one side of the PCB, (c) mounting the PCB, to which the external input and output terminal and the safety element are connected, in a module case having a rectangular parallelepiped structure through an open side of the module case, and connecting electrode terminals of a battery cell to a battery cell terminal connection portion formed at one side of the PCB and the end of the safety element, and (d) mounting the PCM on an upper end sealed portion of the battery cell.

As compared with a method of manufacturing a conventional embedded type secondary battery pack, the secondary battery pack manufacturing method according to the present invention can reduce the number of manufacturing processes and provide a secondary battery pack exhibiting improved structural stability.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
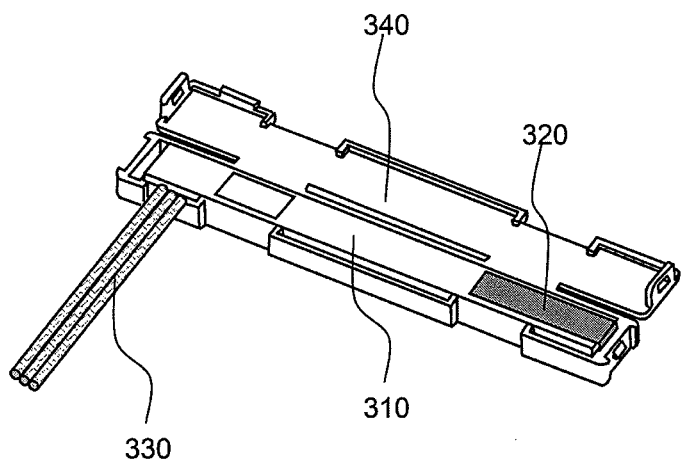
FIG. 1 is a typical view showing a protection circuit module (PCM) according to an embodiment of the present invention.

FIG. 1 is a typical view showing a protection circuit module (PCM) according to an embodiment of the present invention.

Referring to FIG. 1, a PCM 300 is configured to have a structure including a printed circuit board (PCB) 310 having a protection circuit formed thereon, a safety element 320 electrically connected between an electrode terminal (not shown) of a battery cell and the protection circuit of the PCB 310, an external input and output terminal 330 electrically connected to the protection circuit of the PCB 310, and an electrically insulative module case 340 to cover the PCB 310 and the safety element 320 in a state in which the external input and output terminal 330 extends outside.

In FIG. 1, the module case 340 is configured to have an assembly type fastening structure. Alternatively, as previously described, the module case 340 may be a single unit rectangular parallelepiped member, one side of which is open so that electrode terminals (not shown) of the battery cell can be inserted through the open side and which has a slit formed at a side adjacent to the open side so that the external input and output terminal can extend outside through the slit.

Figure 2:
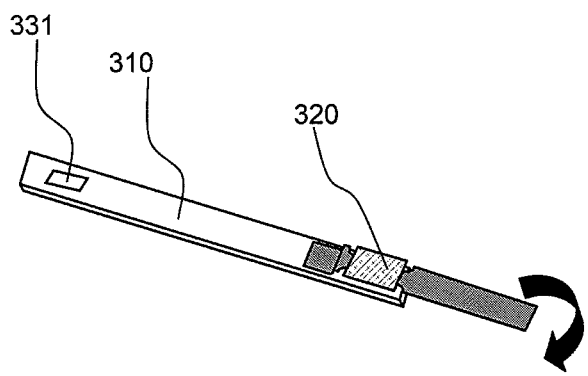
FIG. 2 is a typical view showing a printed circuit board (PCB) and a safety element of FIG. 1.
Figure 3:
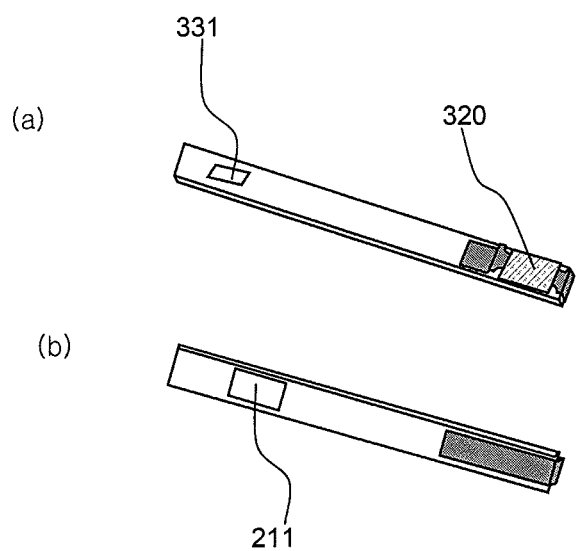
FIG. 3 is a typical view showing front and rear sides of the PCB.
Figure 4:
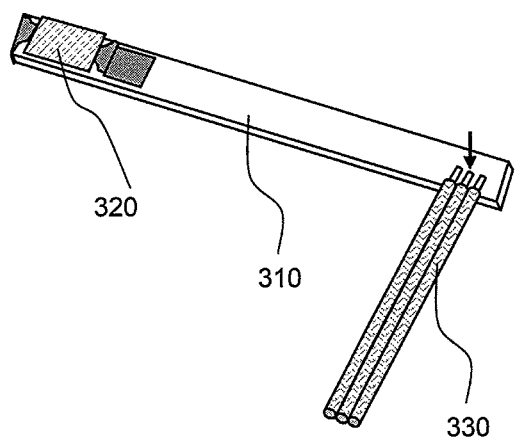
FIG. 4 is a typical view showing the PCB and an external input and output terminal.

FIG. 2 is a typical view showing the PCB and the safety element constituting the PCM of FIG. 1, FIG. 3 is a typical view showing front and rear sides of the PCB, and FIG. 4 is a typical view showing the PCB and the external input and output terminal.

Referring to these drawings together with FIG. 1, a safety element connection portion (not shown) and an external input and output terminal connection portion 331 are formed at a front side a of the PCB 310, and a battery cell terminal connection portion 211 is formed at a rear side b of the PCB 310.

The safety element 320 is bent so that one end of the safety element 320 is located at the rear side of the PCB 310 in a state in which the other end of the safety element 320 is connected to the safety element connection portion (not shown) of the PCB 310 so as to cover one side of the PCB 310. The safety element 320 may be a positive temperature coefficient (PTC) element.

The external input and output terminal 330 is configured in the form of a wire and is electrically connected to the opposite side of the safety element 320 by welding.

According to circumstances, the battery cell terminal connection portion and the safety element connection portion may be formed at the rear side of the PCB 310, and the external input and output terminal connection portion 331 may be formed at the front side or the rear side of the PCB 310.

Figure 5:
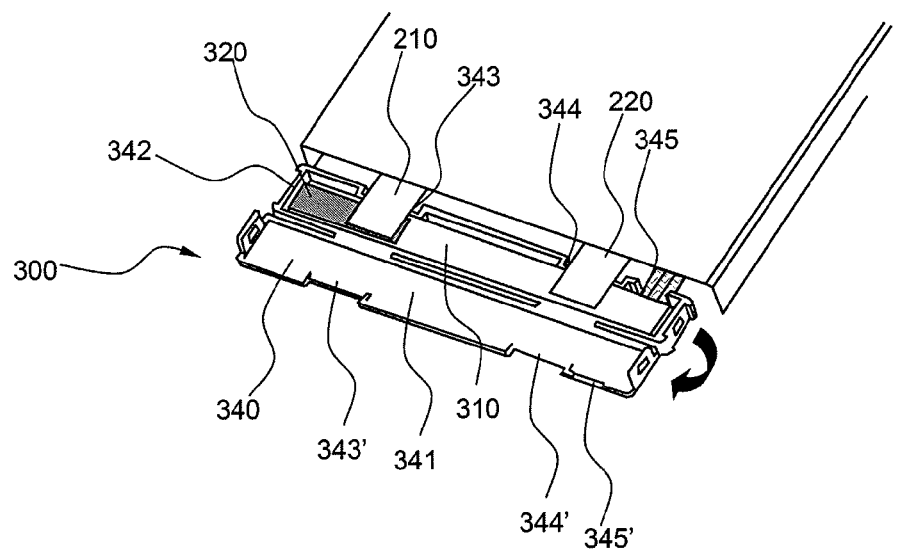
FIG. 5 is a typical view showing an embedded type secondary battery pack according to an embodiment of the present invention.
Figure 6:
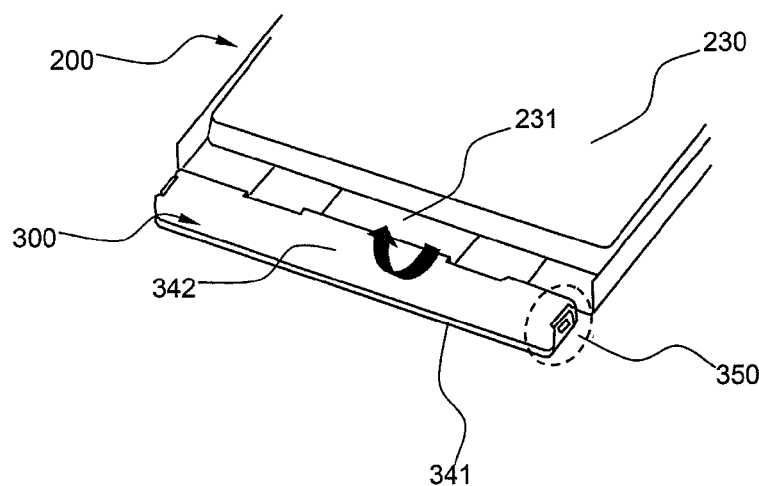
FIG. 6 is a typical view showing a process of loading a PCM of FIG. 5 on an upper end case extension portion of a battery cell.

FIG. 5 is a typical view showing a portion of an embedded type secondary battery pack according to an embodiment of the present invention, and FIG. 6 is a typical view showing a process of loading a PCM of FIG. 5 on an upper end case extension portion of a battery cell.

Referring to these drawings, a secondary battery pack 100 is configured to have a structure in which a PCM 300 is mounted at the top of a plate-shaped battery cell 200.

The battery cell 200 is a plate-shaped battery cell having electrode terminals 210 and 220, each of which is made of a conductive member, formed at the upper end thereof. The battery cell 200 has an electrode assembly of a cathode/separator/anode structure mounted in a battery case 230 made of a laminate sheet including a metal layer and a resin layer in a sealed state.

Here, an upper end case extension portion 231 means an upper end sealed portion formed when the battery case 230 is thermally welded in a sealed state.

In the secondary battery pack according to the present invention, therefore, the PCM 300, in which the PCB 310 and the safety element 320, electrically connected to the electrode terminals 210 and 220 of the battery cell 200, are mounted, is loaded on the upper end case extension portion 231 of the battery cell 200. As compared with a conventional embedded type secondary battery pack, therefore, it is possible to effectively protect the PCM and to considerably reduce the number of parts, thereby greatly improving manufacturing processability.

For example, the module case 340 includes an upper case 341 and a lower case 342, which are connected to each other by a hinge structure. Also, the module case 340 includes through grooves 343, 343', 344 and 344', through which the electrode terminals 210 and 220 of the battery cell 200 are inserted, and through grooves 345 and 345', through which the external input and output terminal 330 extends outside.

In a state in which the PCB 300 and the safety element 320 are connected to the electrode terminals 210 and 220 of the battery cell 220 through the through grooves 343, 343', 344 and 344', and the external input and output terminal 330 extends outside through the through grooves 345 and 345', the PCB 300 and the safety element 320 are mounted in the module case 340 to constitute the PCM 300.

Figure 7:
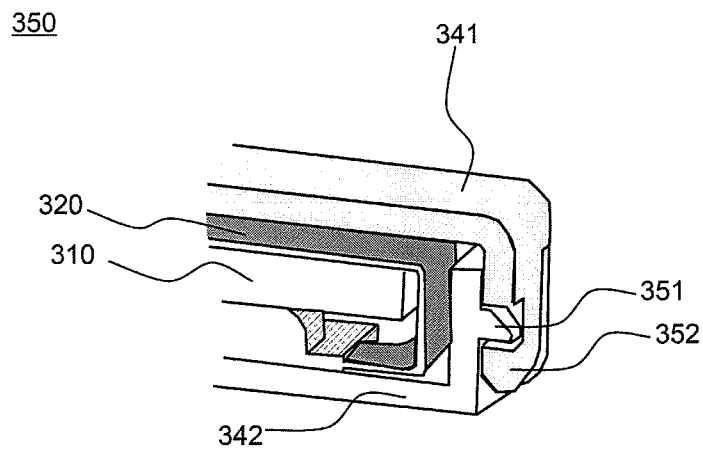
FIG. 7 is an enlarged sectional view showing a fastening structure of FIG. 6.

FIG. 7 is an enlarged sectional view typically showing a fastening structure of FIG. 6.

Referring to FIG. 7 together with FIGS. 5 and 6, the module case 340 is configured to have an assembly type fastening structure 350, by which the upper case and the lower case constituting the module case 340 are coupled to each other in a state in which the PCB 310 and the safety element 320 are mounted in the module case 340.

The assembly type fastening structure 350 is constituted by fastening protrusions 351 formed at opposite lateral side ends of the lower case 342 and fastening grooves 352 formed at opposite lateral side ends of the upper case 341 so that the fastening grooves 352 correspond to the fastening protrusions 351.

After the PCB 310 and the safety element 320 are mounted to the lower case 342 therefore, assembly of the lower case 342 and the upper case 341 is achieved by coupling between the fastening protrusions 351 and the fastening grooves 352 without using additional members.

Figure 8:
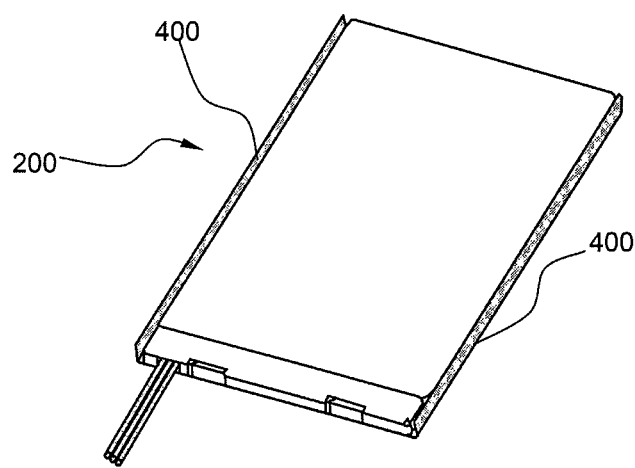
FIG. 8 is a typical view showing a battery cell having insulative tapes attached thereto.
Figure 9:
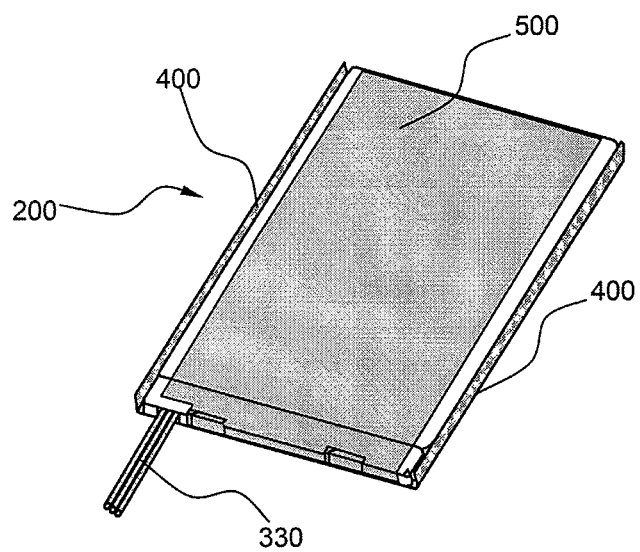
FIG. 9 is a typical view showing a battery cell having a label attached thereto.

FIG. 8 is a typical view showing a battery cell having insulative tapes attached thereto, and FIG. 9 is a typical view showing a battery cell having a label attached thereto.

Referring to these drawings, insulative tapes 400 are attached to opposite lateral sides of a battery cell 200, and a label 500 is attached to cover outer sides of a PCM 300 and the battery cell 200 excluding an external input and output terminal 330.

The insulative tapes 400 secure electrical insulation between a battery case 230 and the outside at opposite lateral sides of the battery case 230, and the label 500, which displays product information, more stably secures electrical connection between electrode terminals of the battery cell and a PCB while maintaining insulation from the battery cell 200.

INDUSTRIAL APPLICABILITY

As is apparent from the above description, the secondary battery pack according to the present invention is configured to have a specific structure in which the PCM, including the module case, is loaded on the upper end case extension portion of the battery cell. Consequently, it is possible to simplify a secondary battery pack assembly process and to improve structural stability of the secondary battery pack.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery pack configured to have a structure in which a protection circuit module (PCM) is mounted to a top of a plate-shaped battery cell having electrode terminals formed at an upper end thereof, wherein
    each of the electrode terminals of the battery cell is made of a plate-shaped conductive member,
    the PCM comprises a printed circuit board (PCB) having a protection circuit formed thereon, a safety element electrically connected between one of the electrode terminals of the battery cell and the protection circuit of the PCB, an external input and output terminal electrically connected to the protection circuit of the PCB, and an electrically insulative module case to cover the PCB and the safety element in a state in which the external input and output terminal extends outside,
    the PCM is loaded on an upper end case extension portion of the battery cell in a state in which the PCM is electrically connected to the electrode terminals of the battery cell by bending of the electrode terminals,
    the upper end case extension portion is an upper end sealed portion formed when a battery case is thermally welded to a sealed state,
    a safety element connection portion and an external input and output terminal connection portion are formed at a front side of the PCB, and a battery cell terminal connection portion is formed at a rear side of the PCB,
    the safety element is bent in U-shape so that one end of the safety element is located at the rear side of the PCB in a state in which the other end of the safety element is connected to the safety element connection portion of the PCB so as to cover one side of the PCB,
    the external input and output terminal is configured in the form of a wire,
    the module case comprises an upper case and a lower case, which are connected to each other by a hinge structure, and the module case is configured to have an assembly type fastening structure, by which the upper case and the lower case constituting the module case are coupled to each other in a state in which the PCB and the safety element are mounted in the module case, and
    the module case comprises through grooves at coupling parts of the upper case and the lower case, the electrode terminals of the battery cell are inserted through the through grooves of the coupling parts of the upper case and the lower case, and another through groove at the coupling parts of the upper case and the lower case, the external input and output terminal extends outside through said another through groove at the coupling parts of the upper case and the lower case.

2. The secondary battery pack according to claim 1, wherein the battery cell is a secondary battery having an electrode assembly of a cathode/separator/anode structure mounted in a battery case made of a laminate sheet comprising a metal layer and a resin layer in a sealed state.

3. The secondary battery pack according to claim 1, wherein the safety element is a positive temperature coefficient (PTC) element or a fuse.

4. The secondary battery pack according to claim 1, wherein the assembly type fastening structure is constituted by fastening protrusions formed at opposite lateral side ends of the lower case and fastening grooves formed at opposite lateral side ends of the upper case so that the fastening grooves correspond to the fastening protrusions.

5. The secondary battery pack according to claim 1, further comprising insulative tapes further attached to opposite lateral sides of the battery cell.

6. The secondary battery pack according to claim 1, further comprising a label to cover outer sides of the PCM and the battery cell excluding the external input and output terminal.

7. A protection circuit module (PCM) to be mounted to a top of a plate-shaped battery cell having electrode terminals, each of which is made of a plate-shaped conductive member, formed at an upper end thereof, wherein
    the PCM comprises a printed circuit board (PCB) having a protection circuit formed thereon, a safety element electrically connected between one of the electrode terminals of the battery cell and the protection circuit of the PCB, an external input and output terminal electrically connected to the protection circuit of the PCB, and an electrically insulative module case to cover the PCB and the safety element in a state in which the external input and output terminal extends outside, the PCM is loaded on an upper end case extension portion of the battery cell in a state in which the PCM is electrically connected to the electrode terminals of the battery cell by bending of the electrode terminals, the upper end case extension portion is an upper end sealed portion formed when a battery case is thermally welded to a sealed state, a safety element connection portion and an external input and output terminal connection portion are formed at a front side of the PCB, and the safety element is bent in U-shape so that one end of the safety element is located at a rear side of the PCB in a state in which the other end of the safety element is connected to the safety element connection portion of the PCB so as to cover one side of the PCB, the external input and output terminal is configured in the form of a wire, and the module case comprises an upper case and a lower case, which are connected to each other by a hinge structure, having through grooves at coupling parts of the upper case and the lower case, the electrode terminals of the battery cell are inserted through the through grooves of the coupling parts of the upper case and the lower case, and another through groove at the coupling parts of the upper case and the lower case, the external input and output terminal extends outside through said another through groove at the coupling parts of the upper case and the lower case, and the module case is configured to have an assembly type fastening structure, by which the upper case and the lower case constituting the module case are coupled to each other in a state in which the PCB and the safety element are mounted in the module case.

\* \* \* \* \*